United States Patent [19]

Hope et al.

[11] 4,357,110

[45] Nov. 2, 1982

[54] MIXING APPARATUS

[76] Inventors: Henry F. Hope; Stephen F. Hope, both of 2421 Wyandotte Rd., Willow Grove, Pa. 19090

[21] Appl. No.: 76,172

[22] Filed: Sep. 17, 1979

[51] Int. Cl.$^3$ .............. B01F 15/02; G05D 11/02; B01F 5/12
[52] U.S. Cl. ................ 366/132; 366/134; 366/137; 366/152; 366/161; 366/173; 366/179; 366/190; 366/262
[58] Field of Search ............. 366/151–154, 366/160, 161, 190, 162, 173, 177, 179, 262, 263, 167, 182, 14, 15, 76, 91, 106, 134, 136, 137, 131, 132, 267–269; 137/112

[56] References Cited

U.S. PATENT DOCUMENTS

| | | | |
|---|---|---|---|
| 2,600,877 | 6/1952 | Jeffree | 137/112 |
| 2,645,463 | 7/1953 | Stearns | 366/154 |
| 3,625,724 | 12/1971 | Alvero | 366/101 |
| 4,106,115 | 8/1978 | Takahashi et al. | 366/161 |
| 4,165,186 | 8/1979 | Tortorich et al. | 366/262 |
| 4,166,704 | 9/1979 | Albert | 366/262 |

FOREIGN PATENT DOCUMENTS 3266 12/1978 European Pat. Off. .
1354841 5/1974 United Kingdom .

Primary Examiner—Philip R. Coe
Assistant Examiner—Timothy F. Simone
Attorney, Agent, or Firm—Z. T. Wobensmith, 2nd; Z. T. Wobensmith, III

[57] ABSTRACT

Mixing apparatus is described in which a plurality of chemical materials are to be incorporated in a carrier liquid, which may be a solvent, such as water, and which is quantitatively predominant, some of the chemical materials being incompatible if brought together directly, or in a wrong sequence, or which are difficult to combine, the materials being combined in the desired proportions in a cascaded arrangement of liquid filled chambers, the respective materials in the desired proportions preferably being supplied from separate sources of materials by pumps, the delivery of the carrier liquid being to a first mixing chamber to which a first chemical material is supplied, the contents of the first mixing chamber being delivered to a second mixing chamber to which another material is supplied, with provisions to prevent back flow, the fluid from the second mixing chamber being delivered to a third mixing chamber to which another chemical material may be added, with additional mixing chambers and pumps as desired to accommodate additional chemical materials, the pumps preferably being simultaneously driven from a single power source and each delivering a controlled quantity of chemical material, with shut off in the event of exhaustion of one of the materials and with shut off if a predetermined quantity of the mixture is available. The material in each mixing chamber is preferably agitated to enhance the mixing.

14 Claims, 2 Drawing Figures

MIXING APPARATUS

BACKGROUND OF THE INVENTION

1. Field of the Invention

This invention relates to mixing apparatus for a plurality of different liquid materials.

2. Description of the Prior Art

It has heretofore been proposed to supply a plurality of fluid components to be combined to a common receiver or supply line. One such system is shown in U.S. Pat. No. 2,641,271 to Pressler. This may involve difficulties if one or more of the chemical materials is incompatible and the structure required is expensive.

Whitehouse, U.S. Pat. No. 3,442,453 shows a similar structure.

Jeffree, in U.S. Pat. No. 2,600,877, shows a device for mixing fluids in which a main pipe 20 has an interposed interrupter 24 for periodically blocking fluid passing through the main pipe 20. A branch pipe 22 leads into the main pipe through a one way valve 23 in a mixing chamber 26 beyond the interrupter 24 so that the inertia of the leading column of liquid beyond the interrupter 24 creates a suction to open the valve 23 and draw a small quantity of liquid B from the pipe 22.

In FIG. 3 two branch pipes 22 and 28 are shown as fed in series into the main pipe thus necessitating two mixing chambers 25 and 29, two inertia columns 21 and 30 and two interrupters 24 and 31.

In FIG. 4 is illustrated apparatus for mixing a very small proportion of fluid B with another fluid A.

Jeffree has no provisions for positive feeding of measured quantities of additives, no provisions for effective agitation to insure mixing, no control in the event of exhaustion of one of the materials to be added and no shut-down when a predetermined quantity of the proper mixture is available.

Stearns, in U.S. Pat. No. 2,645,463, shows method and apparatus for continuous flow mixing. In FIG. 3, a common conduit 3 for fluids has conduit elements 11, 12 and 13 with discharge end portions 11a, 12a and 13a, respectively, opening into the conduit 3. Each of the individual conduit members has structure therein intended for inducing turbulent flow, orifice plate members 11b, 12b and 13b being provided for this purpose. As shown two fluid streams are introduced into the common conduit 3 by the conduits 11 and 12 to be mixed in the zone 14. The stream is advanced past baffle members 15 to induce turbulent flow in the previously combined stream and to homogenize the mixture in the zone 14 prior to introduction of fluid through conduit 13 and its orifice plate member 13b. The reference to homogenizing indicates an attempt to combine substantially immiscible or difficulty miscible materials rather than combining soluble chemical materials. Stearns appears to have a continuously flowing stream and is silent as to the manner of supplying the fluid through the individual conduits and does not undertake to supply any measured quantities of materials. Careful sizing of the main conduit of Stearns, and the conduit elements with their orifices, would be required to induce turbulent flow of a character to achieve the mixing and homogenization desired by Stearns if in fact it could be achieved. If the quantities to be introduced were very small in proportion to the fluid stream there would be a serious problem as to the effectiveness of these small quantities to produce turbulence at a mixing zone and serious doubt as to the efficiency of the distribution of the material thus added.

Stearns also has no provisions for shut-off if a material to be added was exhausted and no provisions for shut-off when an adequate supply of the mixture was available.

SUMMARY OF THE INVENTION

In accordance with the invention mixing apparatus is disclosed for successively adding chemical materials to a carrier liquid, such as water, which may be a solvent and which is the predominant quantitative material and particularly where some of the chemical materials may be incompatible, in a cascaded arrangement of liquid filled chambers in series, the respective chemical materials being separately supplied in the desired proportions by pumps, preferably adjustable as to output, which can be driven from a common power source, the carrier liquid and a first chemical material being delivered to a first mixing chamber and mixed therein with the contents of the first mixing chamber being delivered to a second mixing chamber into which a second chemical material is introduced and mixed, additional mixing chambers with chemical materials supplied thereto being provided to meet the requirements for the number of chemical materials to be brought together, with provisions for preventing back flow and for shutting off operation when one of the materials to be added is exhausted and when an adequate quantity of the mixture is available.

It is the principal object of the invention to provide mixing apparatus for chemical materials to be added to a carrier liquid which is simple in construction and is free of complications which add to the difficulty of assembly and cost.

It is a further object of the invention to provide a mixing system which is simple in construction so as to reduce operating problems.

It is a further object of the invention to provide mixing apparatus in which the components are simple in construction and easy to assemble.

It is a further object of the invention to provide mixing apparatus in which provisions are made for shut-down in the event of exhaustion of one of the materials to be added.

It is a further object of the invention to provide mixing apparatus in which the output is delivered to a receiver and which is shut down when an adequate quantity of liquid mixture is present.

Other objects and advantages features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Figure 1:
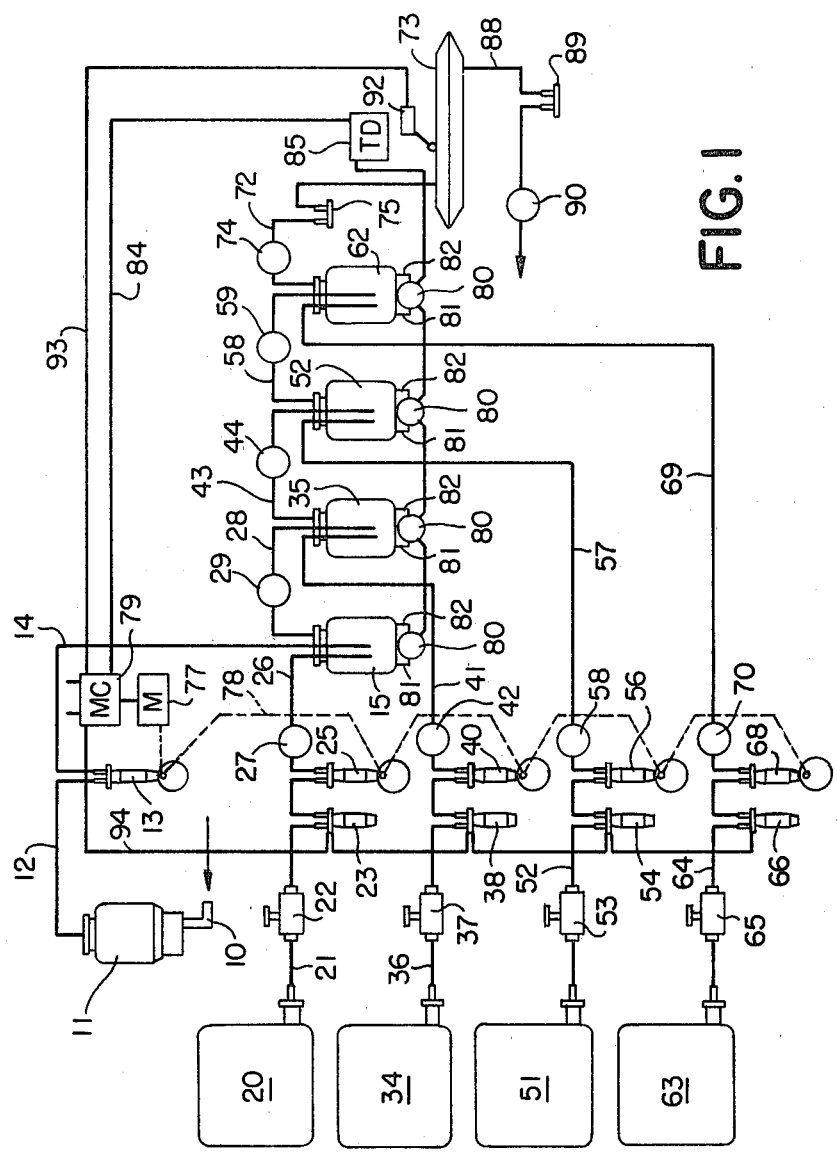
FIG. 1 is a diagrammatic view of mixing apparatus in accordance with the invention.

Referring now more particularly to FIG. 1 a preferred embodiment of the invention is therein shown.

A supply connection 10 for carrier liquid is provided which may extend to a transparent bottle or other suitable receptacle 11 for observing the presence of liquid from the supply connection 10. The nature of the carrier liquid will be determined by the materials to be added and the ultimate use to be made of the liquid mixture. For many purposes the carrier liquid will be water and will be the predominant constituent for some purposes but the mixing apparatus is not restricted in its use to this specific liquid. Other carriers, including organic liquids, can be employed.

The receptacle 11 is connected by a supply connection 12 to a pump 13. The pump 13 can be of any desired type for supplying a measured quantity of the carrier liquid. For this purpose a positive displacement bellows pump having an adjustable stroke to determine the measured quantity of liquid will serve for purposes where a measured quantity of a few gallons is provided. The pump 13 has a delivery connection 14 to a first mixing receptacle or bottle 15.

A first chemical supply reservoir 20 is provided for a first chemical material to be added and mixed which is preferably connected by a fluid connection such as a delivery pipe 21 through a manually operable shut-off valve 22 and control apparatus 23 including a bellows responsive to liquid flow to discontinue mixing if the reservoir 20 is empty. Suitable control apparatus for this purpose is shown in our prior U.S. Pat. No. 4,118,150.

The pipe 21 provides a supply connection for a pump 25. The pump 25 can be of any desired type for supplying a measured quantity of liquids from the reservoir 20. For this purpose a positive displacement bellows pump having an adjustable stroke to determine the quantity of liquid delivered may be employed. The pump 25 is connected by a delivery connection 26 to the first mixing receptacle 15 and preferably to the lower part thereof. A non-return or check valve 27 may be provided in the delivery connection 26.

The first mixing receptacle 15 is connected by a fluid connection 28 to a second mixing receptacle or bottle 35, and preferably to the lower part thereof. A non-return or check valve 29 may be provided in the delivery connection 28.

A second chemical supply reservoir 34 is provided for a second chemical material to be added and mixed in the mixing receptacle 35. The reservoir 34 is preferably connected by a fluid connection 36 such as a delivery pipe through a manually operable shut-off valve 38 and control apparatus 39 similar to the control apparatus 23. Liquid in the fluid connection or pipe 36 is supplied to a pump 40 which is preferably similar to the pump 25. The pump 40 has a fluid connection 41, such as a pipe, to the second mixing receptacle 35 and preferably to the lower part thereof. A non-return or check valve 42 may be provided in the fluid connection 41.

The second mixing receptacle 35 is connected by a fluid connection 43 to a third mixing receptacle or bottle 50 and preferably to the lower part thereof. A non-return or check valve 44 may be provided in the fluid connection 43.

A third chemical supply reservoir 51 is provided for a third chemical material to be added and mixed in the mixing receptacle 50. The reservoir 51 is preferably connected by a fluid connection 52 such as a delivery pipe, through a manually operable shut-off valve 53 and control apparatus 54, similar to the control apparatus 23. Liquid in the fluid connection or pipe 52 is supplied to a pump 56, which is preferably similar to the pump 25. The pump 56 has a fluid connection or pipe 58 extending to the fourth mixing receptacle or bottle 62 and preferably to the lower part thereof. A non-return or check valve 59 may be provided in the fluid connection 58.

A fourth chemical supply reservoir 63 is provided for a fourth chemical material to be added and mixed in the mixing receptacle 62. The reservoir 63 is preferably connected by a fluid connection 64, such as a delivery pipe, through a manually operable shut-off valve 65 and control apparatus 66, similar to the control apparatus 23. Liquid in the fluid connection or pipe 64 is supplied to a pump 68 which is preferably similar to the pump 25. The pump 68 has a fluid connection or pipe 69 extending to the fourth mixing receptacle or bottle 62 and preferably to the lower part thereof. A non-return or check valve 70 may be provided in the fluid connection 69.

The mixing receptacle 62 is preferably connected by a fluid connection 72 to a fluid receiver 73 which may be a tank but is preferably an expandible bag. A non-return valve 74 and adjustable flow restricting valve 75 may be provided in the fluid connection 72.

The pumps 13, 25, 40, 56 and 68 may be driven in any desired manner but it is preferred to provide a motor 77 with a shaft 78, shown diagrammatically in broken lines, to simultaneously drive all the pumps.

The motor 77 is provided with a motor controller 79 for purposes to be explained.

In order to provide agitation adequate to intimately mix and distribute small quantities of chemical materials introduced in the mixing receptacles 15, 35, 50 and 62, each of these receptacles is provided with suitable agitating structure. For this purpose each of the mixing receptacles 15, 35, 50 and 62 can be provided with a motor driven recirculating pump 80 with fluid supply and return connections 81 and 82 to the bottom of each mixing receptacle with the return connections preferably angularly disposed within the receptacles for greater agitation. The motors of the motor driven pumps 80 are preferably connected by an energizing connection 84 from the motor controller 79 through a time delay relay 85 to continue operation of the motor driven pumps 80 even if other portions of the apparatus have been shut off.

The fluid receiver 73 is connected to a delivery line 88 preferably through an adjustable restricting valve 89 and non-return or check valve 90, for use of the resultant fluid with the respective additives intimately mixed and distributed therein.

The fluid receiver 73 preferably has a control element responsive to the filled condition thereof, such as a microswitch 92 which is connected by a conductor 93 to the motor controller 79 for shutting off the motor 77 when a sufficient quantity of liquid is available in the fluid receiver 73.

The liquid presence control elements 23, 38, 54 and 66 are connected by a conductor 94 to the motor controller 79 to stop the motor 77 in the event of exhaustion of the chemical materials in any of the supply reservoirs 20, 34, 51, and 63.

The mode of operation will now be pointed out.

The carrier liquid is supplied through the supply connection 12 and to the pump 13, which supplies a measured quantity of carrier liquid through pipe 14 to the first mixing receptacle 15. The contents of the maintained receptacle 15 are in a continuous state of agitation by its motor driven pump 80.

The first chemical material in liquid form to be added from the first supply reservoir 20 is delivered through the delivery pipe 21 through the valve 22 and control apparatus 23 to the pump 25. A measured quantity of this liquid delivered from the pump 25, as determined by the setting thereof, is delivered through the fluid delivery connection 26 to the receptacle 15 and into the agitated liquid therein. The liquid from the receptacle 15 advances, by reason of the continuous additions thereto, through the fluid connection 28 to the interior of the second mixing receptacle 35 and into the liquid therein. The contents of the receptacle 35 are maintained in a continuous state of agitation by motor driven pump 80.

A second chemical material in liquid form from the second supply reservoir 34 is delivered through the delivery pipe 36, the manual shut-off valve 37 and the liquid presence control 38 to the pump 40. A measured quantity of this liquid delivered from the pump 40, as determined by the setting thereof, is delivered through pipe 41 to the interior of the second mixing receptacle 35 and into the agitated liquid therein.

A third chemical material in liquid form from the third supply reservoir 51 is delivered through the delivery pipe 52, the manual shuft-off valve 53 and the liquid presence control 54 to the pump 56. A measured quantity of this liquid, delivered from the pump 56 as determined by the setting thereof, is delivered through pipe 57 to the third mixing receptacle 50.

A fourth chemical material in liquid form from the fourth supply reservoir 63 is delivered through the delivery pipe 64, the manual shut-off valve 65 and the liquid presence control 66 to the pump 68. A measured quantity of this liquid delivered from the pump 68, as determined by the setting thereof, is delivered through pipe 69 to the fourth mixing receptacle 62.

The liquid from the fourth mixing receptacle 62 is delivered through the fluid connection 72, as controlled by the adjustable flow restricting valve 75, to the fluid receiver 73 for delivery through the delivery line 88.

It will be noted that the supplies from the supply reservoirs 20, 34, 51 and 63 are controlled by the valves 22, 37, 53 and 67, respectively. The absence of liquid available in the supply reservoirs 20, 34, 51 and 63, as determined by the controllers 23, 38, 54 and 66 is effective to shut-off the motor 77 through the motor control 79 in the event of exhaustion of the contents of any of these supply reservoirs and thereby avoid the waste of chemicals.

It will also be noted that the pumps 13, 25, 40, 56 and 68, preferably all driven together by the motor 77, are controlled also by the micro-switch 92 but with continued operation of the shaft 78.

Figure 2:
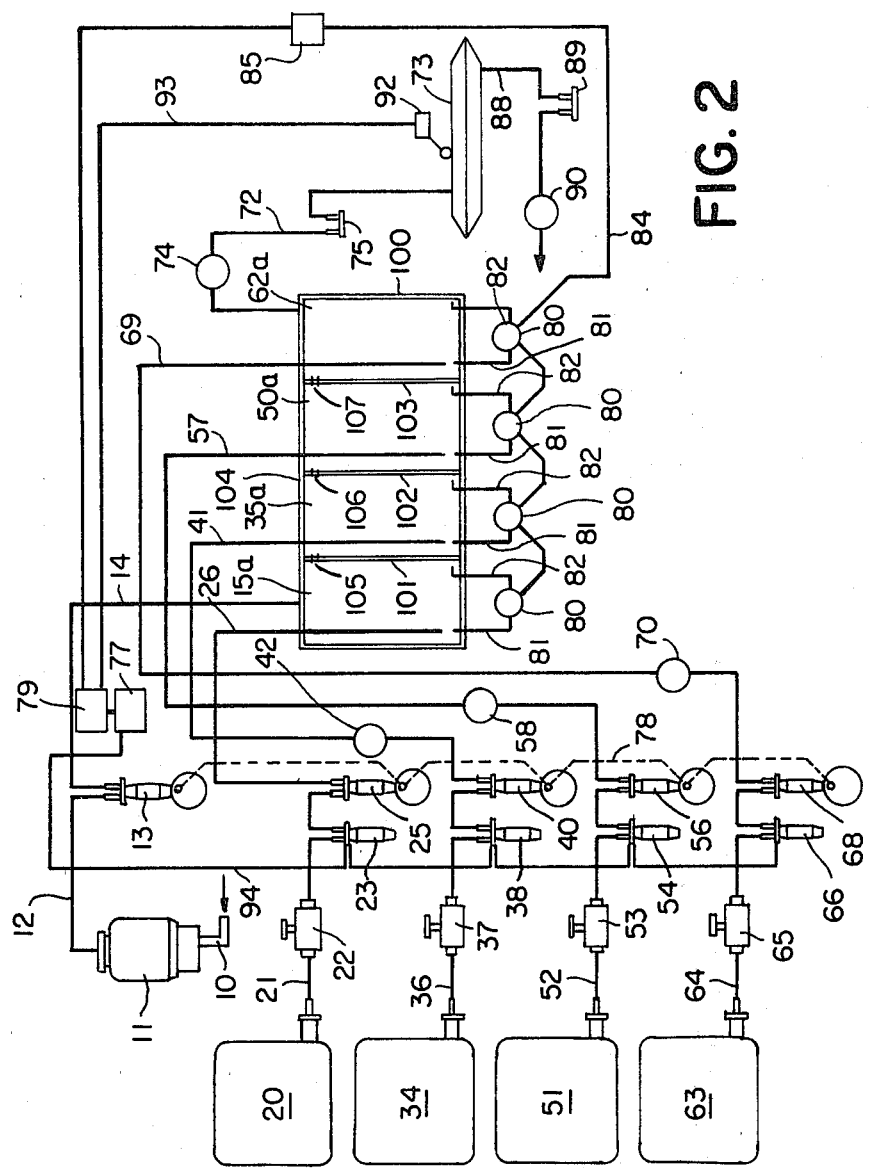
FIG. 2 is a view showing another form of the invention.

Referring now to FIG. 2, the structure there shown is similar to that previously described except that the mixing receptacles 15, 35, 50 and 62, previously shown as separate receptacles are brought together in a tank 100, with a plurality of partition walls 101, 102 and 103 separating a plurality of mixing chambers 15a, 35a, 50a and 62a, and with a cover 104 at the top. The partition walls 101, 102 and 103 have openings 105, 106 and 107 for advance of liquid respectively through the mixing chambers 15a, 35a, 50a and 62a for delivery, as before through a fluid connection 72.

The carrier liquid is delivered, as before, through a delivery connection 14 with the first additive chemical material delivered from the supply reservoir 20 through the delivery connection 26 to the mixing chamber 15a.

The chemical materials from the supply reservoirs 34, 51 and 63 are delivered to the mixing chambers 35a, 50a and 62a through the fluid connections 41, 57 and 69, respectively.

The mode of operation is essentially the same as pointed out with respect to FIG. 1 with successive advance through the mixing chambers 15a, 35a, 50a and 62a through the openings 105, 106 and 107, with agitation of the liquid in each of the mixing chambers to insure adequate mixing and distribution of the additive materials.

The mixing apparatus as shown in FIGS. 1 and 2 is filled with liquid for proper operation.

We claim:

1. Mixing apparatus comprising, in a closed liquid system, a supply connection for a first supply of liquid,
a first mixing chamber comprising a receptacle,
means for intermittently delivering a measured quantity of liquid from said first supply connection to the lower portion of said first mixing chamber,
a supply connection for a second supply of liquid,
means for intermittently delivering a measured quantity of liquid from said second supply connection to said first mixing chamber,
means comprising a pump externally disposed with respect to said first mixing chamber and having inlet and delivery connections connected to the lower portion of said mixing chamber for continuously agitating the liquid in the lower portion of said first mixing chamber,
the intermittent supplying of said measured quantities of said liquids advancing the liquid through said mixing apparatus, and
liquid storage means for the reception of liquid from said receptacle.

2. Mixing apparatus as defined in claim 1 in which said means for delivering a measured quantity of liquid is a pump.

3. Mixing apparatus as defined in claim 2 in which said pump is a motor driven pump.

4. Mixing apparatus as defined in claim 2 in which said pump is an adjustable output bellows pump.

5. Mixing apparatus as defined in claim 1 in which both said means for delivering a measured quantity of liquid are driven together.

6. Mixing apparatus as defined in claim 1 in which means is provided interposed between said second supply of liquid and said means for delivering a measured quantity for deactivating said means for delivering upon exhaustion of liquid supplied to said means for delivering.

7. Mixing apparatus as defined in claim 1 in which said means for agitating the liquid in said first mixing chamber comprises a motor driven pump.

8. Mixing apparatus as defined in claim 7 in which said means for agitating is a motor driven pump connected to said mixing chamber for recirculation of liquid therein.

9. Mixing apparatus as defined in claim 1 in which said liquid delivery means includes a receptacle, and members responsive to the quantity of liquid in said receptacle for deactivating said means for delivering a measured quantity.

10. Mixing apparatus as defined in claim 1 in which said mixing chamber is a separate receptacle.

11. Mixing apparatus as defined in claim 1 in which said mixing chamber comprises a closed tank.

12. Mixing apparatus as defined in claim 1 having in addition a supply connection for a third supply of liquid,
a second mixing chamber comprising a receptacle,
means for delivering the liquid from said first mixing chamber to said second mixing chamber,
means for intermittently supplying a measured quantity of liquid from said third supply of liquid to said second mixing chamber, and
means comprising a pump externally disposed with respect to said second mixing chamber and having inlet and delivery connections connected to the lower portion of said second mixing chamber for continuously agitating the liquid in the lower portion of said second mixing chamber.

13. Mixing apparatus as defined in claim 12 in which both said mixing chambers are separate receptacles.

14. Mixing apparatus as defined in claim 12 in which both said mixing chambers are disposed in a closed tank.

* * * * *